United States Patent
Munk-Hansen

(10) Patent No.: US 12,176,758 B2
(45) Date of Patent: Dec. 24, 2024

(54) SEGMENT FOR A GENERATOR OF A WIND TURBINE

(71) Applicant: Siemens Gamesa Renewable Energy A/S, Brande (DK)

(72) Inventor: Thorkil Munk-Hansen, Fredericia (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 228 days.

(21) Appl. No.: 17/789,302

(22) PCT Filed: Dec. 1, 2020

(86) PCT No.: PCT/EP2020/084004
§ 371 (c)(1),
(2) Date: Jun. 27, 2022

(87) PCT Pub. No.: WO2021/139926
PCT Pub. Date: Jul. 15, 2021

(65) Prior Publication Data
US 2022/0393525 A1    Dec. 8, 2022

(30) Foreign Application Priority Data
Jan. 10, 2020  (EP) ..................... 20151161

(51) Int. Cl.
*H02K 1/18*     (2006.01)
*F03D 9/25*     (2016.01)
*H02K 7/18*     (2006.01)

(52) U.S. Cl.
CPC ............. *H02K 1/187* (2013.01); *F03D 9/25* (2016.05); *H02K 7/1838* (2013.01); *F05B 2220/706* (2013.01); *H02K 2213/12* (2013.01)

(58) Field of Classification Search
CPC ...... H02K 1/187; H02K 1/148; H02K 7/1838; H02K 2213/12; F03D 9/25; F05B 2220/706
(Continued)

(56) References Cited

U.S. PATENT DOCUMENTS

2013/0241365 A1 *  9/2013  Booth ................... H02K 1/28
                                                    310/400
2013/0302144 A1   11/2013  Demtroder et al.
(Continued)

FOREIGN PATENT DOCUMENTS

CN    201877756 U    6/2011
CN    103168169 A    6/2013
(Continued)

OTHER PUBLICATIONS

International Search Report & Written Opinion for PCT/EP2020/084004 issued Jan. 19, 2021.

*Primary Examiner* — Michael Andrews
(74) *Attorney, Agent, or Firm* — Schmeiser, Olsen & Watts LLP

(57) ABSTRACT

A stator of an electrical machine is provided including a body axially extending along the longitudinal axis between two opposite axial ends, the body radially extending perpendicular to the longitudinal axis between a radially inner surface and a radially outer surface, wherein at least one of the two opposite axial ends includes a plate inclined with respect to the longitudinal axis of an angle greater than 0° and lower than 90°.

20 Claims, 3 Drawing Sheets

(58) Field of Classification Search
USPC .................................................... 310/254.1
See application file for complete search history.

(56) References Cited

U.S. PATENT DOCUMENTS

| | | |
|---|---|---|
| 2014/0252922 A1 | 9/2014 | Ritchey et al. |
| 2017/0288500 A1* | 10/2017 | Eriksen ................... F03D 1/00 |
| 2017/0353080 A1* | 12/2017 | Thygesen ............ H02K 1/2791 |
| 2019/0363591 A1* | 11/2019 | Jöckel ...................... H02K 1/16 |
| 2021/0286007 A1* | 9/2021 | Corbetta ................ H02K 1/187 |

FOREIGN PATENT DOCUMENTS

| | | |
|---|---|---|
| CN | 104753017 A | 7/2015 |
| CN | 208723500 U | 4/2019 |
| EP | 2 578 872 A1 | 4/2013 |
| EP | 3 301 792 A1 | 4/2018 |
| EP | 3 352 334 A1 | 7/2018 |
| WO | 2015/024590 A1 | 2/2015 |

* cited by examiner

SEGMENT FOR A GENERATOR OF A WIND TURBINE

CROSS-REFERENCE TO RELATED APPLICATIONS

This application claims priority to PCT Application No. PCT/EP2020/084004, having a filing date of Dec. 1, 2020, which claims priority to EP Application No. 20151161.5, having a filing date of Jan. 10, 2020, the entire contents both of which are hereby incorporated by reference.

FIELD OF TECHNOLOGY

The following relates to a segment for a generator of a wind turbine and a generator of a wind turbine comprising such segment. The segment may be included in the stator of the generator.

BACKGROUND

In a wind turbine, the horizontal distance from the centre of gravity of the blade rotor to the tower is important for the gravity load on the main structure. This means that for a wind turbine with a generator between the blade rotor and the tower, the length of the generator is important. The total length of the generator can be seen as the sum of the lengths of an active and a passive generator part, where the active generator part is formed of magnets and windings while the passive generator part is formed of support structure and electrical connections (such as busbars) for transporting the produced electrical power away from the generator, e.g., to a power converter located at ground level.

Accordingly, there may be a need for a way of maximizing the active length of magnets and windings and minimizing the passive length used for structure and electrical connections.

SUMMARY

An aspect relates to a stator or of an electrical machine including a body axially extending along a longitudinal axis between two opposite axial ends, the body radially extending perpendicular to the longitudinal axis between a radially inner surface and a radially outer surface. At least one of the two opposite axial ends includes a plate inclined with respect to the longitudinal axis of an angle greater than 0° and lower than 90°.

The above-described geometry may be conveniently applied to a stator of a wind turbine generator.

A busbar arrangement may be provided in the wind turbine generator, which comprises a plurality of busbars for transporting electric power away from the generator, wherein each busbar is arranged along the inclined plate provided at one axial end of the stator.

By arranging the busbars along an inclined surface of the stator, i.e., with individual radial distances from the axis (e.g., as opposed to arranging the busbars at the same radial distance from the axis), a compact busbar arrangement can be obtained. In particular, the axial extension of the busbar arrangement (which contributes to the total length of the generator, in particular to the inactive part of the generator) can be reduced while still allowing easy access to each busbar during mounting and maintenance.

According to embodiments of the present invention, at least one of the two opposite axial ends includes a conical plate, which may be coaxial with the longitudinal axis. The busbar arrangement may be provided along such conical plate. The conical plate may be provided at the drive end of the stator, i.e., the axial end of the wind turbine generator axially facing the wind rotor. According to other embodiments of the present invention, a conical plate may be provided at both the drive end and the non-drive end of the stator.

According to embodiments of the present invention, the stator includes a cylindrical inner wall where the radially inner surface is provided and a cylindrical outer wall where the radially outer surface is provided. The annular hollow space between the cylindrical inner wall and the cylindrical outer wall may be dimensioned to provide the required degree of stiffness to the body. In particular, the body may include at least a radial stiffener for radially connecting cylindrical inner wall and the cylindrical outer wall.

According to embodiments of the present invention, the stator is segmented, including a plurality of segments circumferentially extending about a longitudinal axis of the stator between two opposite circumferential ends, wherein two adjacent segments are circumferentially joined together at two respective circumferential ends.

The aspects defined above, and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
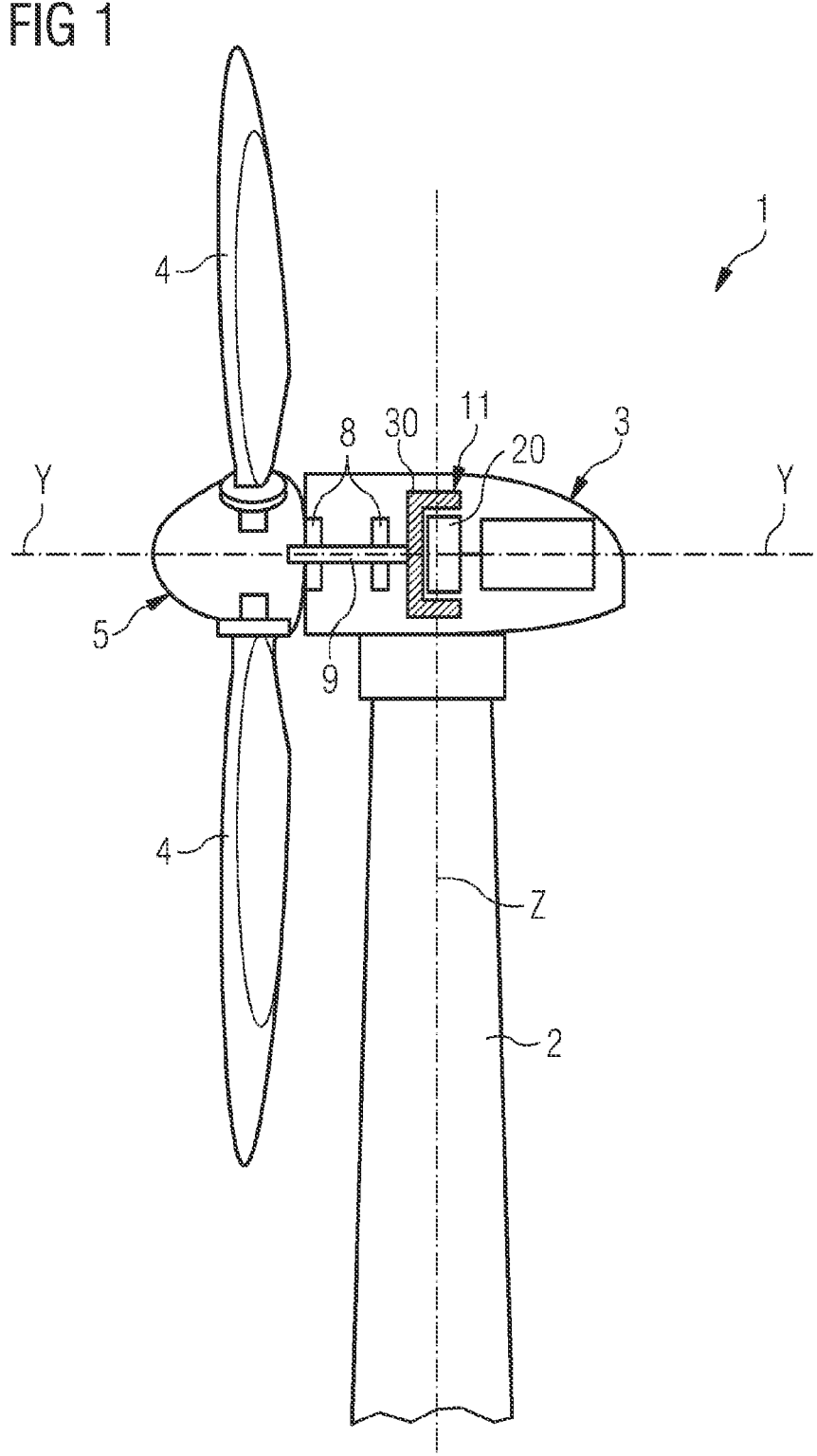
FIG. 1 shows a schematic section of a wind turbine including an electrical generator with a stator according to embodiments of the present invention.

FIG. 1 shows a wind turbine 1 according to embodiments of the invention. The wind turbine 1 comprises a tower 2, which is mounted on a non-depicted foundation. A nacelle 3 is arranged on top of the tower 2. The wind turbine 1 further comprises at least a wind rotor 5 having a hub and at least one blade 4 (in the embodiment of FIG. 1, the wind rotor comprises three blades 4, of which only two blades 4 are visible). The wind rotor 5 is rotatable around a rotational longitudinal axis Y. The blades 4 extend substantially radially with respect to the longitudinal axis Y. In general, when not differently specified, the terms axial, radial and circumferential in the following are made with reference to the rotational longitudinal axis Y. The wind turbine 1 comprises at least one electric generator 11, including a stator 20 and a rotor 30. The rotor 30 is rotatable with respect to the stator 20 about the rotational longitudinal axis Y. The wind rotor 5 is coupled with the rotor 30 and both are connected to an outer ring of a main bearing assembly 8. The outer ring of the main bearing assembly 8 rotates about the rotational longitudinal axis Y with respect to a static inner ring, which is coupled with a main shaft 9 extending along the longitudinal axis Y.

Figure 2:
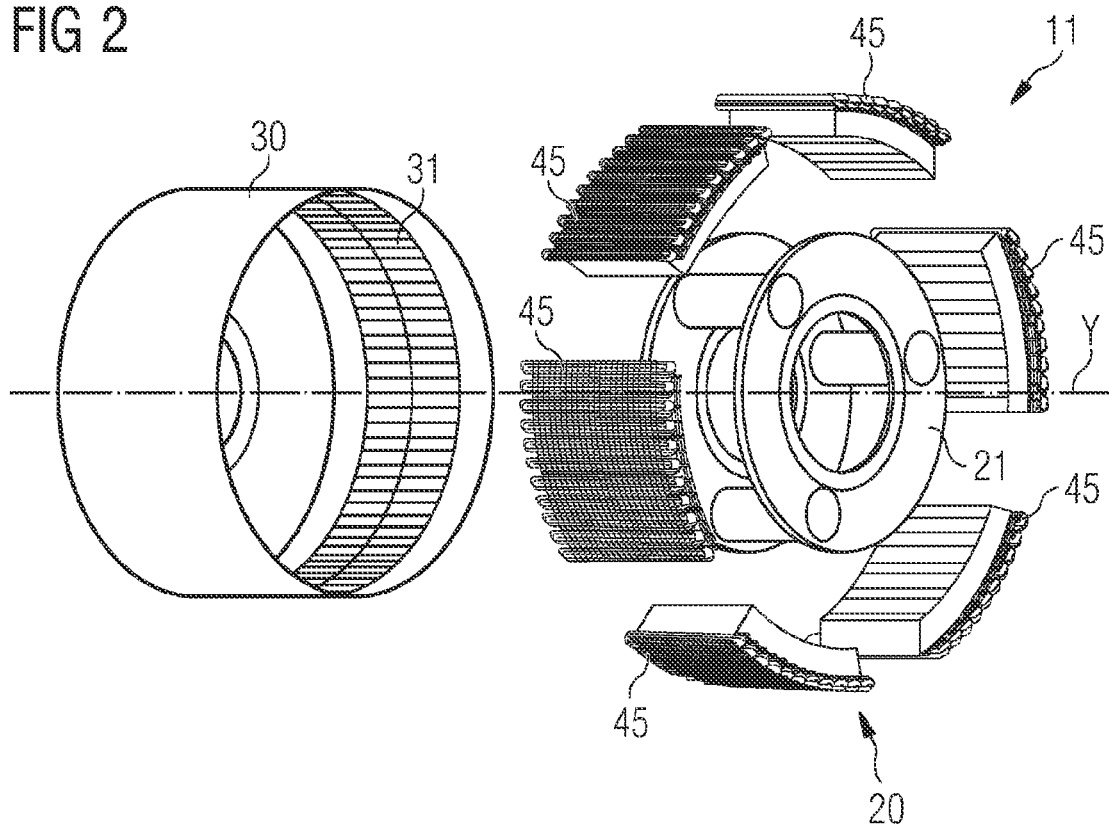
FIG. 2 shows an exploded view of an electrical generator with a stator according to embodiments of the present invention.

FIG. 2 shows an exploded view of the electrical generator 11 with the rotor 30 and the stator 20. The stator 20 comprises a cylindrical inner core 21 to which six segments 45 are attached. Each segment 45 has a circumferential angular extension of 60°. According to other embodiments of the present invention, the stator 20 comprises a plurality of segments having a number of segments different from six. According to another possible embodiment of the present invention, the stator 20 is not segmented, i.e., the stator includes one single segment covering the entire angular extension of 360°. The rotor 30 has a conventional structure with a plurality of circumferentially distributed rotor permanent magnets 31. The stator segment 45 has structure comprising a plurality of teeth circumferentially interposed between a plurality of slots. The teeth protrude according to the radial direction. The stator segment 45 further comprises coil windings 48 inserted in the slots of the segment 45. Teeth, slots, and windings 48 are not a specific object of embodiments of the present invention and therefore not described in further details.

Figure 3:
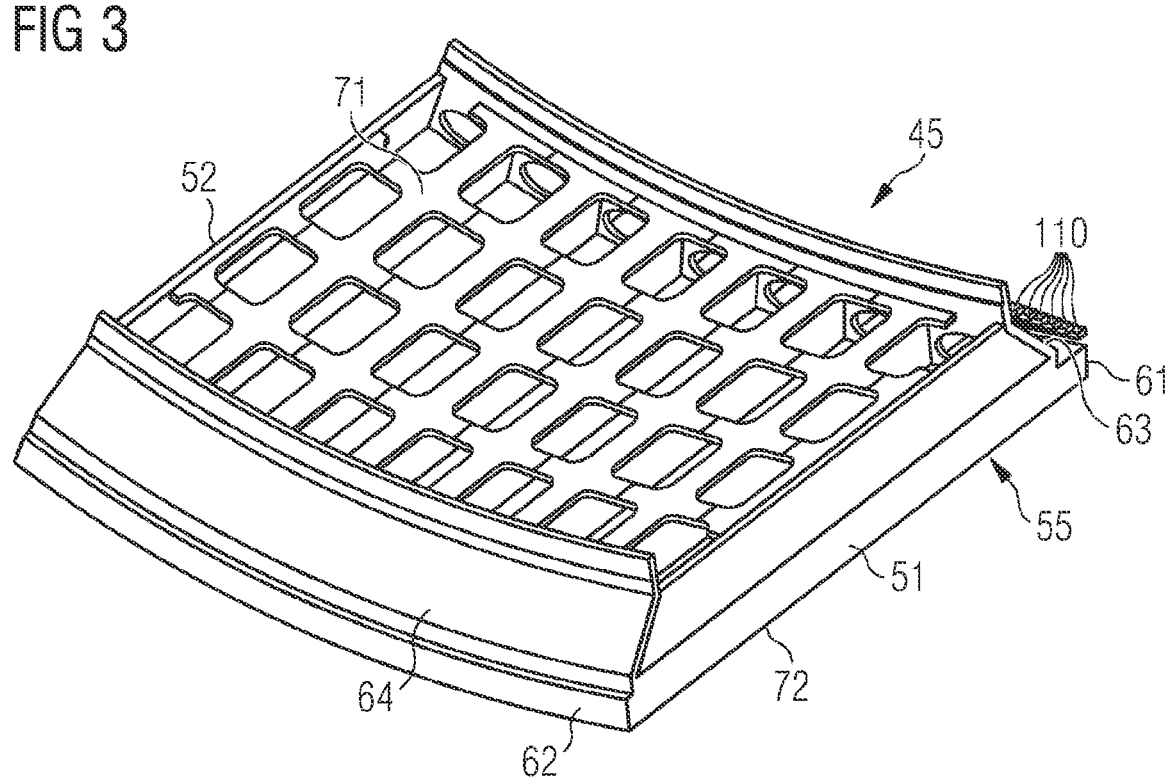
FIG. 3 shows an axonometric view of a segment of the stator of FIG. 2.
Figure 4:
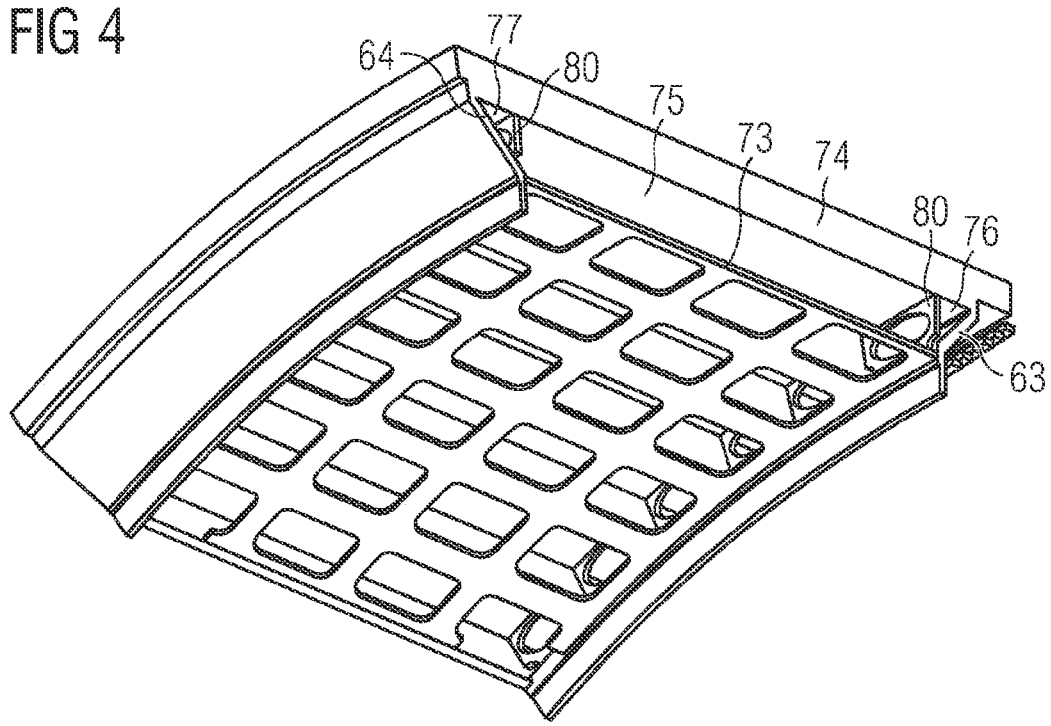
FIG. 4 shows another axonometric view of a segment of the stator of FIG. 2.
Figure 5:
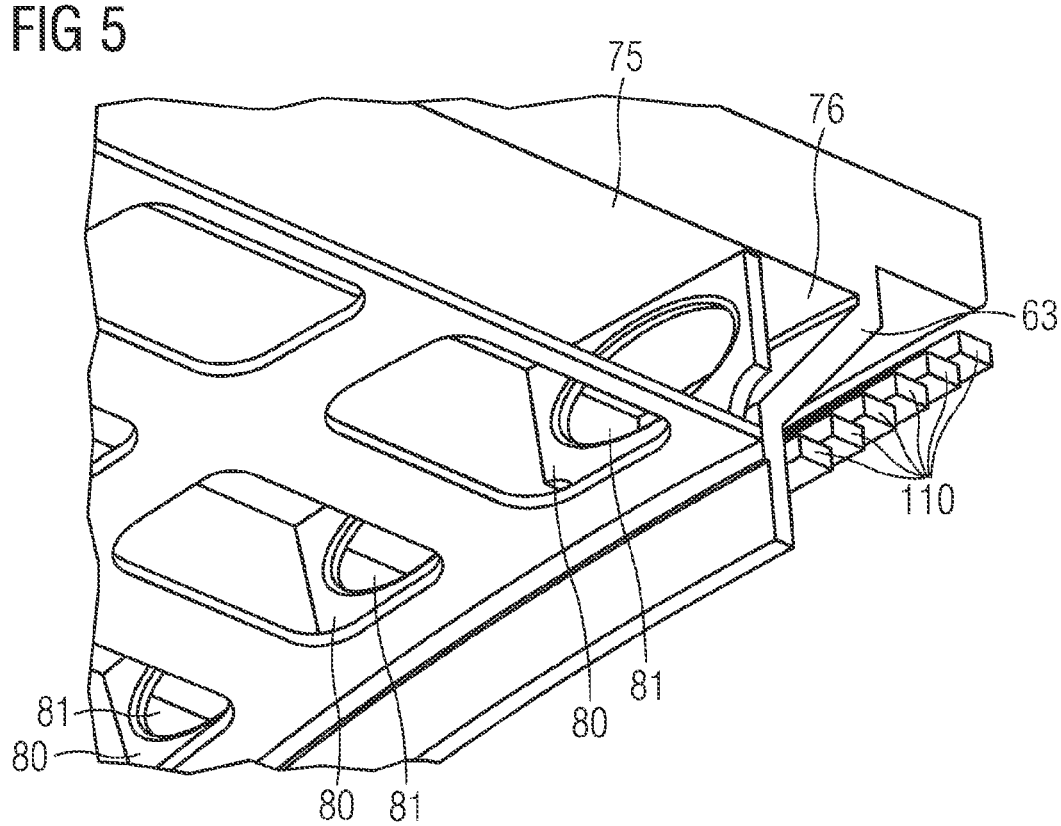
FIG. 5 shows a magnified view of a portion of the stator of FIG. 2

FIGS. 3 to 5 show more in details a stator segment 45. Each stator segment 45 includes a segment body 55 axially extending along the longitudinal axis Y between two opposite axial ends 61, 62. The two opposite axial ends 61, 62 may be, according to embodiment of the present invention, a drive end 61 and a non-drive end 62. The segment body 55 radially extends perpendicular to the longitudinal axis Y between a radially inner surface 71 and a radially outer surface 72. The radially inner surface 71 is provided on a cylindrical inner wall 73. The radially outer surface 72 is provided on a cylindrical outer wall 74, which is radially distance from the cylindrical inner wall 73. The segment body 55 circumferentially extends about the longitudinal axis Y between two opposite circumferential ends 51, 52. Two adjacent segments 45 are circumferentially joined together at two respective circumferential ends 51, 52. According to the embodiment of where the stator 20 is not segmented, i.e. the stator includes one single segment covering the entire angular extension of 360°, the circumferential ends 51, 52 are not present in the only body 55 covering the entire angular extension. One or both of the two opposite axial ends 61, 62 includes a respective plate 63, 64 inclined with respect to the longitudinal axis Y of an angle greater than 0° and lower than 90°. The plates 63, 64 may be conical. According to other embodiments of the present invention, the plates 63, 64 may have another shape, different from the conical shape, but inclined with respect to the longitudinal axis Y. The conical plates 63, 64 may be coaxial with the longitudinal axis Y. A first plate 63 may be provided at the drive end 61. A second plate 64 may be provided at the non-drive end 62. The inclination of the second plate 64 with respect to the longitudinal axis Y may be different from the inclination of the first plate 63. In particular, the first plate 63 may be cylindrical and the second plate may be plane and perpendicular to the longitudinal axis Y. The assembly of the plates 63, 64, the cylindrical inner wall 73 and the cylindrical outer wall 74 provides an external enclosure of the segment body 55.

The segment body 55 includes a plurality of stiffeners 80 and radially connecting the cylindrical inner wall 73 and the cylindrical outer wall 74, for providing a desired level of stiffness to the segment body 55. The plurality of stiffeners 80 may be circumferentially distributed around the longitudinal axis Y.

According to an embodiment of the invention, two series of circumferentially distributed stiffeners 80 are provided in proximity of the plates 63, 64, respectively. In the hollow space comprised between the conical plates 63, 64, the cylindrical inner wall 73 and cylindrical outer wall 74, the segment body 55 includes:

- a central cylindrical hollow space 75 comprised between the cylindrical inner wall 73, the cylindrical outer wall 74 and the two series of circumferentially distributed stiffeners 80,
- a first conical hollow space 76 comprised between the first conical plate 63 at the drive end of the stator 20, the cylindrical outer wall 74 and a first series of circumferentially distributed stiffeners 80,
- a second conical hollow space 77 comprised between the second conical plate 64 at the non-drive end of the stator 20, the cylindrical outer wall 74 and a second series of circumferentially distributed stiffeners 80.

Each stiffener may include a through hole 81 for allowing passages inside the structure of the segment body 55, for example between the central cylindrical hollow space 75 and the conical hollow spaces 76, 77. Such passages may be used for construction, maintenance or inspection.

FIGS. 3 to 5 also show a busbar arrangement disposed along the first conical plate 63. The busbar arrangement comprises busbars 110 arranged at different positions along the longitudinal axis Y. The busbars 110 have rectangular cross sections. Each busbar 110 is shaped like an arc at least partially surrounding the longitudinal axis Y. This inclined or "staircase" arrangement of the busbars, which leading the power out of the generator in a cross section, significantly increases the ratio between the active length and the total length of the generator 11.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electrical generator, comprising:
   a stator including a body axially extending along a longitudinal axis of the stator between two opposite axial ends, the body radially extending perpendicular to the longitudinal axis between a radially inner surface and a radially outer surface, wherein at least one of the two opposite axial ends includes a plate inclined with respect to the longitudinal axis of an angle greater than 0° and lower than 90°; and
   a busbar arrangement comprising a plurality of rigid busbars for transporting electric power away from the electrical generator, wherein the plurality of rigid busbars are arranged along the plate.

2. The electrical generator as claimed in claim 1, wherein at least one of the two opposite axial ends includes a conical plate.

3. The electrical generator as claimed in claim 2, wherein the conical plate is coaxial with the longitudinal axis.

4. The electrical generator as claimed in claim 1, wherein the body axially extends along the longitudinal axis between a drive end and a non-drive end of the electrical generator, the drive end including the plate inclined with respect to the longitudinal axis.

5. The electrical generator as claimed in claim 4, wherein the non-drive end includes a second plate inclined with respect to the longitudinal axis of an angle greater than 0° and lower than 90°.

6. The electrical generator as claimed in claim 1, wherein the body includes a cylindrical inner wall where the radially inner surface is provided and a cylindrical outer wall where the radially outer surface is provided.

7. The electrical generator as claimed in claim 6, wherein the body includes at least a radial stiffener for radially connecting the cylindrical inner wall and the cylindrical outer wall.

8. The electrical generator as claimed in claim 1, including a plurality of segments circumferentially extending about a longitudinal axis of the stator between two opposite circumferential ends, wherein two adjacent segments are circumferentially joined together at two respective circumferential ends.

9. The electrical generator as claimed in claim 1, wherein the plurality of rigid busbars are disposed on the drive end of the plate.

10. The electrical generator as claimed in claim 1, wherein a first rigid busbar of the plurality of rigid busbars is located at a different position along the longitudinal axis than a second rigid busbar of the plurality of rigid busbars.

11. The electrical generator as claimed in claim 1, wherein a first rigid busbar of the plurality of rigid busbars is located at a different position along a radial axis than a second rigid busbar of the plurality of rigid busbars.

12. The electrical generator as claimed in claim 1, wherein a first rigid busbar of the plurality of rigid busbars is located at a different radial position and a different longitudinal position than a second rigid busbar of the plurality of rigid busbars.

13. The electrical generator as claimed in claim 1, wherein a first rigid busbar of the plurality of rigid busbars is not located at a same radial position as a second rigid busbar and is not located at a same longitudinal position as the second rigid busbar.

14. The electrical generator as claimed in claim 1, wherein the plurality of rigid busbars are arranged in a staircase arrangement.

15. The electrical generator as claimed in claim 1, wherein the plurality of rigid busbars are arranged in a staircase arrangement along the plate.

16. The electrical generator as claimed in claim 1, wherein the plate forms an inclined surface and the plurality of rigid busbars are arranged along the inclined surface.

17. The electrical generator as claimed in claim 1, wherein individual rigid busbars of the plurality of rigid busbars have different individual radial distances.

18. The electrical generator as claimed in claim 1, wherein the plate forms an inclined surface and the plurality of rigid busbars are arranged along the inclined surface such that individual rigid busbars of the plurality of rigid busbars have different individual radial positions and different individual longitudinal positions.

19. A wind turbine, comprising:
an electrical generator including a stator having a body axially extending along a longitudinal axis of the stator between two opposite axial ends, the body radially extending perpendicular to the longitudinal axis between a radially inner surface and a radially outer surface, wherein at least one of the two opposite axial ends includes a plate inclined with respect to the longitudinal axis of an angle greater than 0° and lower than 90, and a busbar arrangement comprising a plurality of rigid busbars for transporting electric power away from the electrical generator, wherein the plurality of rigid busbars are arranged along the plate.

20. The wind turbine as claimed in claim 19, wherein the plate forms an inclined surface and the plurality of rigid busbars are arranged along the inclined surface such that individual rigid busbars of the plurality of rigid busbars have different individual radial positions and different individual longitudinal positions.

* * * * *